US006609115B1

(12) United States Patent
Mehring et al.

(10) Patent No.: US 6,609,115 B1
(45) Date of Patent: Aug. 19, 2003

(54) METHOD AND APPARATUS FOR LIMITED ONLINE ACCESS TO RESTRICTED DOCUMENTATION

(75) Inventors: Dave Mehring, Sussex, WI (US); Sunil Melepatt Palliyal, Waukesha, WI (US); Hubert A. Zettel, Waukesha, WI (US); Rick Frowein, Waukesha, WI (US); Lawrence E. Ploetz, Brookfield, WI (US)

(73) Assignee: GE Medical Systems, Waukesha, WI (US)

( * ) Notice: Subject to any disclaimer, the term of this patent is extended or adjusted under 35 U.S.C. 154(b) by 0 days.

(21) Appl. No.: 09/475,331

(22) Filed: Dec. 30, 1999

(51) Int. Cl.⁷ .............................................. G06F 17/60
(52) U.S. Cl. ................................ 705/51; 705/64; 707/9
(58) Field of Search .............................. 705/51–53, 64; 713/200–202; 707/9–10

(56) References Cited

U.S. PATENT DOCUMENTS

| | | | | |
|---|---|---|---|---|
| 5,369,702 A | * | 11/1994 | Shanton | 380/4 |
| 5,710,889 A | * | 1/1998 | Clark et al. | 395/244 |
| 5,828,832 A | * | 10/1998 | Holden et al. | 395/187.01 |
| 6,263,447 B1 | * | 7/2001 | French et al. | 713/201 |
| 6,279,111 B1 | * | 8/2001 | Jensenworth et al. | 713/200 |
| 6,289,462 B1 | * | 9/2001 | McNabb et al. | 713/201 |
| 6,334,121 B1 | * | 12/2001 | Primeaux et al. | 706/62 |
| 6,351,817 B1 | * | 2/2002 | Flyntz | 713/202 |

FOREIGN PATENT DOCUMENTS

EP   0 534 679 A2 * 3/1993 ............ G07C/9/00

OTHER PUBLICATIONS

Stein, Weaving a Secure Web, Security Management v41n9 pp 72–81, Sep. 1997, ISSN: 0145–9406.*

* cited by examiner

Primary Examiner—James P. Trammell
Assistant Examiner—Mary Cheung
(74) Attorney, Agent, or Firm—Ziolkowski Patent Solutions Group, LLC; Kevin Conroy; Carl B. Horton

(57) ABSTRACT

A system and method are disclosed for providing access over a computer network to system documentation at an online central service facility. A user is required to enter identifying indicia prior to accessing the online central service facility, the facility having at least one documentation database containing product and/or service data therein. The identifying indicia can include a user identification and a password, for example, and are matched with user data stored in a user database in the online central service facility to authenticate the user before providing user access into a document management system. Also, the user is checked to further determine what particular product and/or service data the user is entitled to. Such particular product or service data is then delivered to the user.

24 Claims, 8 Drawing Sheets

METHOD AND APPARATUS FOR LIMITED ONLINE ACCESS TO RESTRICTED DOCUMENTATION

BACKGROUND OF THE INVENTION

The present invention relates generally to remote servicing of products or equipment and, more particularly, to a method and system for limiting user access to an online centralized service facility containing system documentation for certain equipment, such as medical diagnostic equipment.

Medical diagnostic equipment and supporting systems, such as medical imaging systems, have become increasing complex in recent years. Examples of such systems include magnetic resonance imaging (MRI) systems, computer tomography (CT) systems, ultrasound and x-ray systems, and positron emission tomography (PET) systems. To add to the complexity of each particular imaging system, many facilities today incorporate a variety of such equipment. In larger facilities, the systems may be networked to permit common management and control.

Because medical diagnostic systems are critical elements in the diagnosis and treatment of patients, their use must not be delayed by a slow response for service or maintenance. Due to the increasing complexity of these systems, trained service personnel are oftentimes not on location with the equipment. Therefore, remote servicing of medical diagnostic equipment has become very important.

Remote servicing of medical diagnostic equipment has traditionally been performed via voice communication between operations personnel and a centralized servicing facility. Operations personnel would call a remote service facility to report malfunctions and ask questions regarding the proper operation and settings for the equipment. When such queries could not be sufficiently handled by telephone, a service or field engineer would be dispatched to troubleshoot the system and provide the needed assistance.

Improvements in computer networks have greatly facilitated the task of offering maintenance assistance to medical imaging equipment. In particular, rather than having to call a service center and talking to a technician or engineer, or having to await a return call from the service center, network technologies now facilitate proactive techniques wherein the service center may contact the medical diagnostic equipment to check the equipment's status. Further advancements have been proposed to provide remote service to medical diagnostic systems in an effort to provide the level of service on a continual and interactive basis as needed by many facilities.

Some users, such as service engineers, require access to different product/service data than other users. In particular, the service engineer usually requires access to restricted or proprietary and extremely sensitive product/service data in the form of system documentation to enable system problem-solving and proper servicing of equipment. It is in the business interest of the operator of the central service facility to limit access to such restricted and highly sensitive data. Preferably field service personnel and other permitted users could access such product/service data of a highly sensitive nature from the system being serviced, while other users who lack the necessary security clearance are prevented from accessing the same data.

Thus, there is a need for a system for providing a wide variety of product/service data to a wide variety of users on the basis of different levels of security. The system should also be capable of providing different access rights to different persons.

It would therefore be desirable to have a system and method for providing limited user access to system documentation stored at an online central service facility. It would further be desirable for the system and method to occur so that any data transfer taking place would be done with a high level of trust that the user is entitled to access desired product/service data.

SUMMARY OF THE INVENTION

The invention is directed to a use of a secured software application by a remote system user to access documentation related to a particular product at a central service facility. Delivery of the documentation is managed on the basis of a level of security clearance and on the basis of community membership of the remote system user. A single-factor security scheme is utilized to determine whether remote system users seeking access to low-level protected software applications are authentic. Business rules are utilized to determine whether authenticated users seeking access should be authorized and to what security level should be provided for access to product/service documentation relating to the equipment the user possesses.

In accordance with one aspect of the invention, a document delivery method for providing online access over a computer network to system documentation is disclosed. The method requires a user to enter identifying indicia via a user interface so that the user may be matched with user data that is stored in at least one user database. The user data is checked for authentication purposes by an online central service facility, which has at least one documentation database, the documentation database having product and/or service data stored therein. The method further requires that the user is authenticated for access into a document management system, with such authentication being based on the aforementioned identifying indicia. The user data is checked to determine what particular product/service data the user is entitled to from the document management system. The method also provides for delivery of the particular product/service data to the user.

In accordance with another aspect of the invention, a computer data signal, representing a sequence of instruction and embodied in a carrier wave, is disclosed to provide limited user access over a computer network to a document management system. The sequence of instructions, when executed by one or more processors, causes the processors to connect a user accessible computer to an online central service facility via the computer network. The one or more processors are further caused to transmit a user identification over the computer network so that the user may be matched with user data that is stored in at least one user database of the online central service facility. The one or more processors are further caused to authenticate the user for access into a document management system in the online central service facility. The processors are also caused to specify what particular product/service data the user is entitled to based on user parameters. The user parameters are stored within the document management system.

In accordance with another aspect of the invention, a document management system is disclosed to provide product/service databased on a level of security for a particular user. The system comprises at least one online central service facility having at least one computer and at least one database, and which has access to product/service data. The system also comprises a server that is communicatively linked to the online central service facility. The server is capable of being connected to a user accessible computer so as to allow user access to the online central service facility. The at least one database contains product/service data and user data. The at least one online central service facility computer is programmed to authenticate the user for access into the document management system in the online central service facility, as well as specify what particular product/service data the user is entitled to based on user parameters that are stored within the document management system.

The present invention is particularly useful in providing a user with access to system documentation and delivery of such documentation wherein the access is limited based on a level of security, thereby determining what any given user is entitled to. Access and delivery are provided over a computer network, such as the Internet, but can also be via a closed, dedicated system, such as a direct dial-up system, an intranet, or a dedicated open line network. Using the invention provides a swift, automated, and secure way of ensuring that system documentation is only accessed by appropriately-authorized users.

Various other features, advantages and objects of the present invention will be made apparent from the following detailed description and the drawings.

BRIEF DESCRIPTION OF THE DRAWING

The drawings illustrate the best mode presently contemplated for carrying out the invention.

In the drawings.

DETAILED DESCRIPTION OF THE PREFERRED EMBODIMENTS

The following detailed description of the preferred embodiment of the invention is presented in the context of a central facility for servicing a multiplicity of remotely located medical diagnostic systems and workstations via a network. However, it should be appreciated that the invention has application in any system where remote systems utilize licensed software and/or database files and are connected to at least one central facility via a network.

Figure 1:
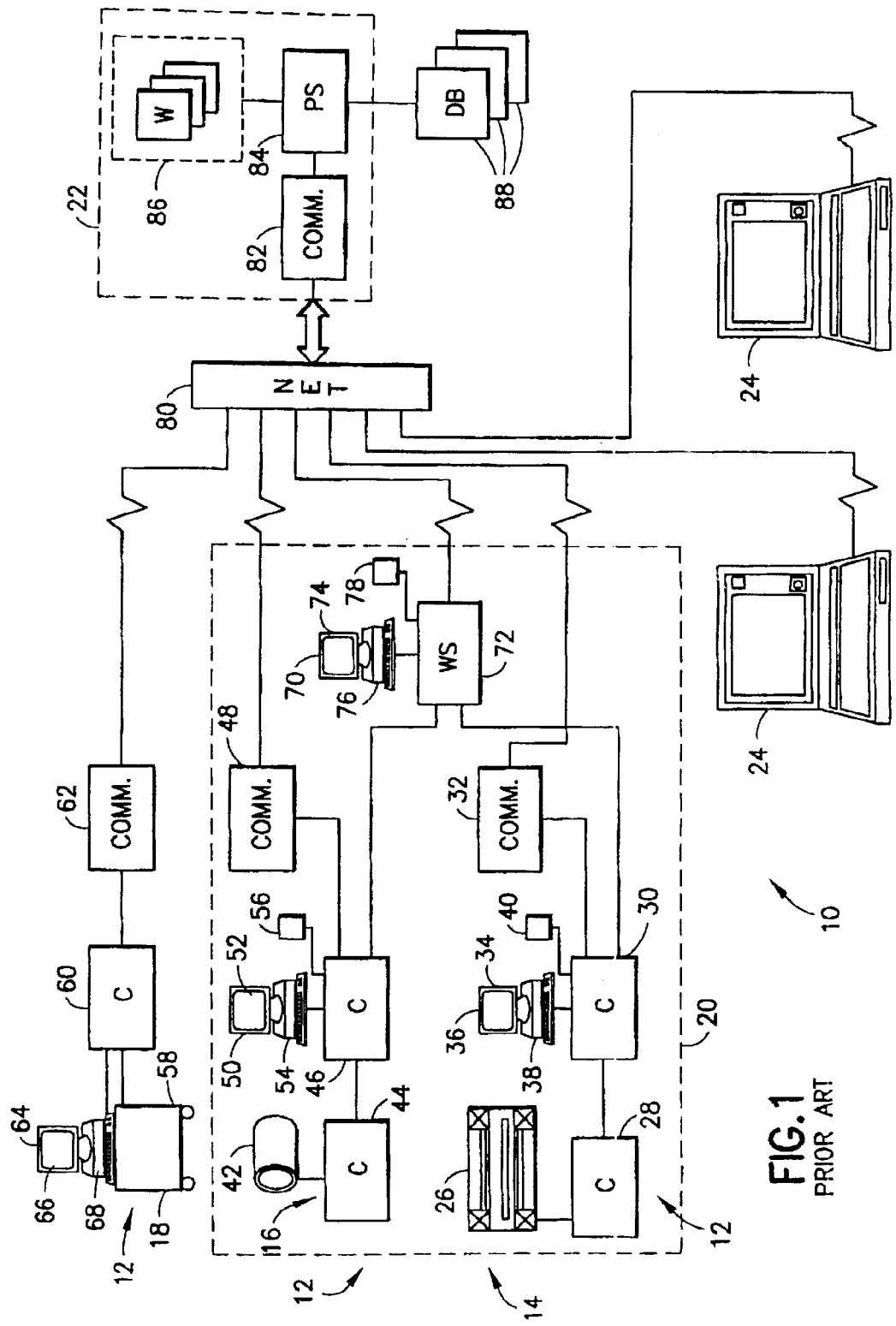
FIG. 1 is a diagrammatical representation of a series of medical diagnostic systems coupled to a service facility via a network connection for providing centralized service and data interchange between the diagnostic systems and the service facility.

Referring to FIG. 1, a prior art service system 10 is illustrated for providing centralized service to a plurality of remotely located medical diagnostic systems 12. In the embodiment shown in FIG. 1, the medical diagnostic systems include a magnetic resonance imaging (MRI) system 14, a computerized tomography (CT) system 16, and an ultrasound imaging system 18. Other systems may include x-ray and positron emission tomography (PET) systems. The diagnostic systems may be positioned in a single location or facility, such as a medical facility 20, or may be remote from one another as shown in the case of ultrasound system 18. The diagnostic systems are serviced from a centralized service facility 22. Moreover, a plurality of field service units 24 may be coupled in the service system for transmitting service requests, verifying service status, transmitting service data etc. as described more fully below.

Depending upon the modality of the systems, various subcomponents or subsystems will be included. In the case of MRI system 14, such systems will generally include a scanner 26 for generating pulsed magnetic fields and for collecting signals from emissions by gyromagnetic material within a subject of interest. The scanner is coupled to a control and signal detection circuit 28 which, in turn, is coupled to a system controller 30. System controller 30 includes a uniform platform for interactively exchanging service requests, messages and data with service facility 22 as described more fully below. System controller 30 is linked to a communications module 32, which may be included in a single or separate physical package from system controller 30. System controller 30 is also linked to an operator station 34, which will typically include a computer monitor 36, a keyboard 38, as well as other input devices 40, such as a mouse. In a typical system, additional components may be included in system 14, such as a printer or photographic system for producing reconstructed images based upon data collected from scanner 14.

Similarly, CT system 16 will typically include a scanner 42 which detects portions of x-ray radiation directed through a subject of interest. Scanner 42 is coupled to a generator and controller, as well as to a signal acquisition unit, represented collectively at reference numeral 44, for controlling operation of an x-ray source and gantry within scanner 42, and for receiving signals produced by a detector array moveable within the scanner. The circuitry within the controller and signal acquisition components is coupled to a system controller 46 which, like controller 30 mentioned above, includes circuitry for commanding operation of the scanner and for processing and reconstructing image data based upon the acquired signals. System controller 46 is linked to a communications module 48, generally similar to communications module 32 of MRI system 14, for transmitting and receiving data for central service of system 16. Also, system controller 46 is coupled to an operator station 50 which includes a computer monitor 52, a keyboard 54, as well as other input devices 56, such as a mouse. Moreover, like MRI system 14, CT system 16 will generally include a printer or similar device for outputting reconstructed images based upon data collected by scanner 42.

Other modality devices will include circuitry and hardware particularly configured for acquiring or producing signals in accordance with their particular design. In particular, ultrasound imaging system 18 will generally include a scanner and data processing unit 58 for transmitting ultrasound signals into a subject of interest, and for acquiring resultant signals which are processed for reconstructing a useful image. The system includes a system controller 60 which regulates operation of scanner 58 and which processes acquired signals to reconstruct the image. Moreover, system 18 includes a communications module 62 for transmitting service requests, messages and data between system controller 60 and service facility 22. System 18 also includes an operator station 64, including a monitor 66, as well as input devices such as a keyboard 68.

Where more than one medical diagnostic system is provided in a single facility or location, as indicated in the case of MRI and CT systems 14 and 16 in FIG. 1, these may be coupled to a management station 70, such as in a radiology department of a hospital or clinic. The management station may be linked directly to controllers for the various diagnostic systems, such as controllers 30 and 46 in the illustrated example. The management system may include a computer workstation or personal computer 72 coupled to the system controllers in an intranet configuration, a file-sharing configuration, a client/server arrangement, or any other suitable arrangement. Management station 70 will typically include a monitor 74 for viewing system operational parameters, analyzing system utilization, and exchanging service requests and data between the remote facility 20 and the central service facility 22. Input devices, such as a standard computer keyboard 76 and mouse 78, may also be provided to facilitate the user interface. It should be noted that, alternatively, the management system, or other diagnostic system components, may be stand-alone, i.e., not coupled directly to a diagnostic system. In such cases, the service platform described herein, and some or all of the service functionality may nevertheless be provided on the management system. Similarly, in certain applications, a diagnostic system may consist of a stand-alone or networked picture archiving communications and retrieval system or a viewing station provided with some or all of the functionality described herein.

The communication modules mentioned above, as well as workstation 72 and field service units 24, may be linked to service facility 22 via a remote access network 80. For this purpose, any suitable network connection may be employed. Preferred network configurations include both proprietary or dedicated networks, as well as open networks, such as the Internet. Data may be exchanged between the diagnostic systems, field service units 24, and central service facility 22 in any suitable format, such as in accordance with the Internet Protocol (IP), the Transmission Control Protocol (TCP), or other known protocols. Moreover, certain of the data may be transmitted or for-matted via markup languages, such as the HyperText Markup Language (HTML), or other standard languages. The preferred interface structures and communications components are described in greater detail below.

Within service facility 22, messages, service requests and data are received by communication components as indicated generally at reference numeral 82. Components 82 transmit the service data to a service center processing system, represented generally at reference numeral 84 in FIG. 1. The processing system manages the receipt, handling and transmission of service data to and from the service facility. In general, processing system 84 may include one or a plurality of computers, as well as dedicated hardware or software servers for processing the various service requests and for receiving and transmitting the service data, as described more fully below. Service facility 22 also includes a bank of operator workstations 86, which may be staffed by service engineers who address the service requests and provide off and online service to the diagnostic systems in response to the service requests. Also, processing system 84 may be linked to a system of databases or other processing systems 88 at or remote from the service facility 22. Such databases and processing systems may include extensive database information on operating parameters, service histories, etc., both for particular subscribing scanners and for extended populations of diagnostic equipment. As described below, such databases may be employed both for servicing of particular diagnostic systems and for tracking such servicing, as well as for deriving comparison data for use in servicing a particular system or a family of systems.

Figure 2:
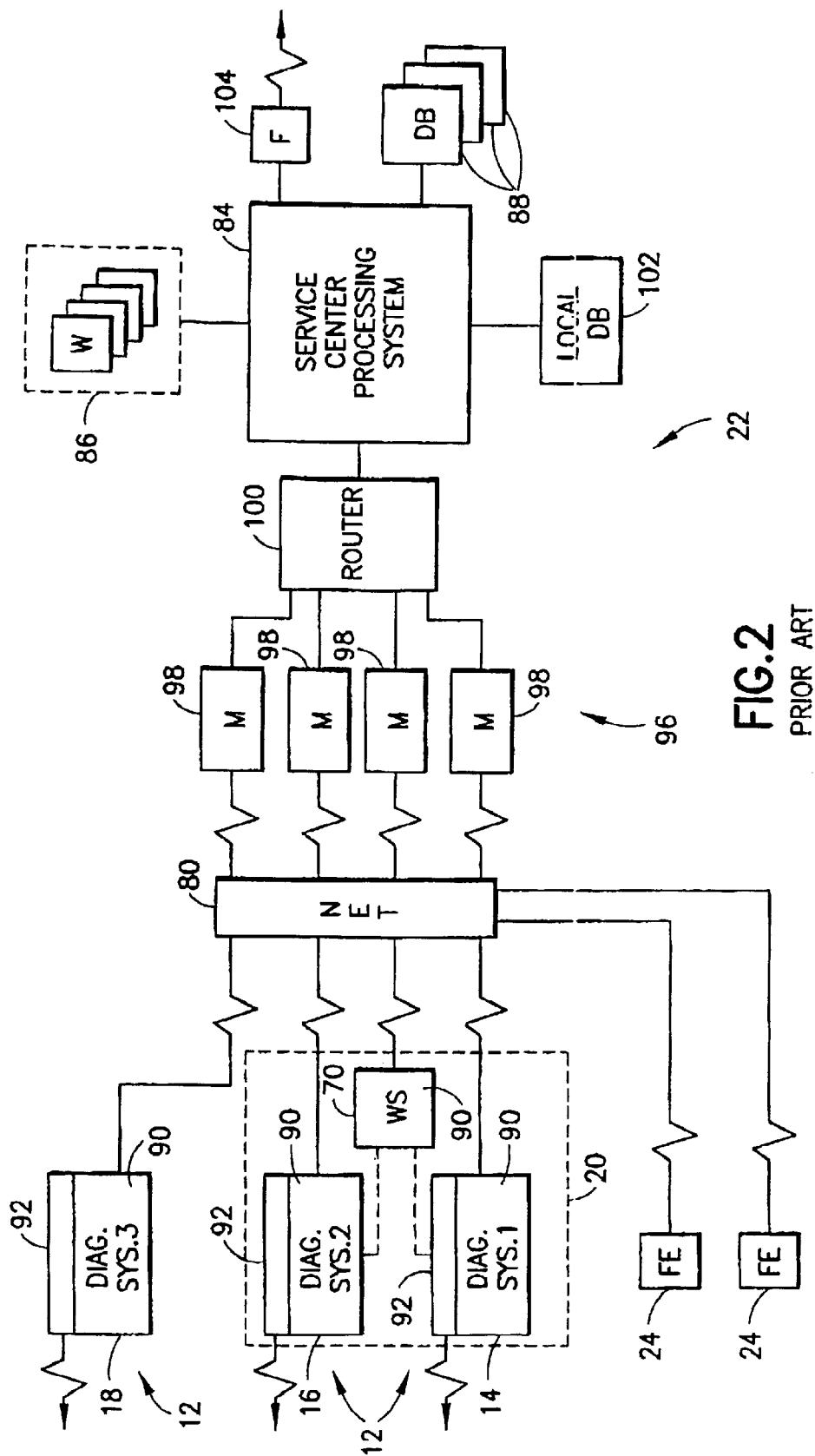
FIG. 2 is a block diagram of the systems shown in FIG. 1, illustrating certain functional components of the diagnostic systems and the service facility.

FIG. 2 is a block diagram illustrating the foregoing system components in a functional view. As shown in FIG. 2, remotely located field service units 24 and diagnostic systems 12 can be linked to the central service facility 22 via a network connection as illustrated generally at reference numeral 80. Within each diagnostic system 12, a uniform service platform 90 is provided. Platform 90 includes hardware, firmware, and software components adapted for composing and transmitting service requests and service task lists, transmitting and receiving service data, establishing network connections, and managing financial or subscriber arrangements between the diagnostic system and the service facility. Preferably, the platform 90 is integrated into the system controller of the diagnostic system. These platforms provide a uniform graphical user interface at each diagnostic system, which can be adapted to various system modalities to facilitate interaction of clinicians and radiologists with the various diagnostic systems for service functions. The platforms enable the scanner designer to interface directly with the control circuitry of the individual scanners, as well as with memory devices at the scanners, to access image, log and similar files needed for rendering requested or subscribed services. Where a management station 70 is provided, a similar uniform platform is preferably loaded on the management station to facilitate direct interfacing between the management station and the service facility. In addition to the uniform service platform 90, each diagnostic system is preferably provided with an alternative communications module 92, such as a facsimile transmission module for sending and receiving facsimile messages between the remotely located scanner and the central service facility.

Messages and data transmitted between the diagnostic systems and the service facility traverse a security barrier or "firewall" contained within processing system 84, which prevents unauthorized access to the service facility in a manner generally known in the art. A modem rack 96, including a series of modems 98, receives the incoming data, and transmits outgoing data through a router 100, which manages data traffic between the modems and the service center processing system 84.

As mentioned above, processing system 84 receives and processes the service requests and data, and interfaces with additional service components, both at the service facility and remote from the facility. As shown in FIG. 2, operator workstations 86 are coupled to the processing system, as are remote databases or computers 88. In addition, at least one local service database 102 is provided for verifying license and contract arrangements, storing service record files, log files, etc. Moreover, one or more communication modules 104 are linked to processing system 84 to send and receive facsimile transmissions between the service facility and the diagnostic systems or field service units.

Figure 3:
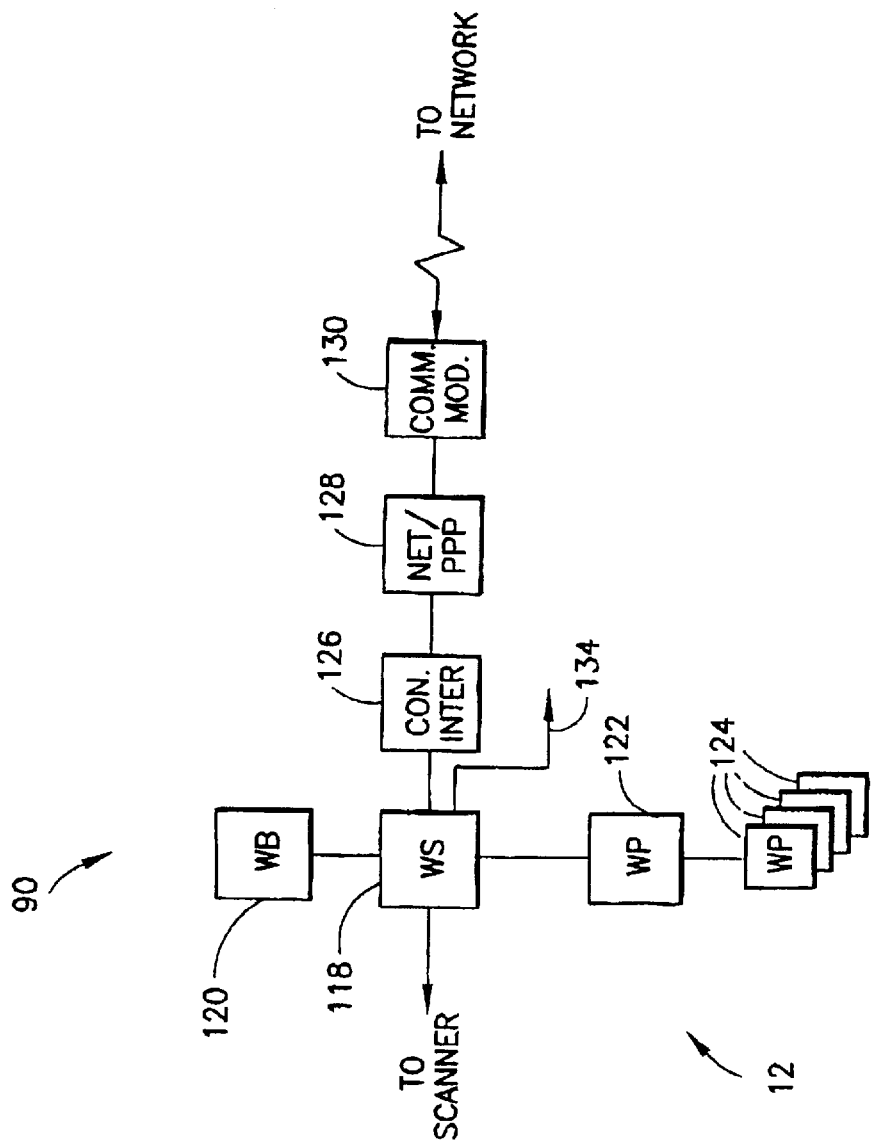
FIG. 3 is a block diagram showing the functional components of a uniform service platform suitable for use in a remote system.

FIG. 3 shows the various functional components comprising the uniform service platform 90 within each diagnostic system 12. This uniform service platform can be employed in the preferred embodiment of the invention to facilitate remote systems accessing software applications over a network. The uniform platform resides as software stored in a web server 118. Web server 118 facilitates data exchange between the diagnostic system and the service facility, and permits a series of web pages 122 and 124 to be viewed via a web browser 120. Preferably server 118 and browser 120 support HTTP applications and the browser supports Java applications. The main web page 122 is preferably a markup language page, such as an HTML page displayed for the system user on a monitor at the diagnostic system. Main web page 122 is preferably accessible from a normal operating page in which the user will configure examination requests, view the results of examinations, etc., such as via an on-screen icon. Through main web page 122, a series of additional web pages 124 are accessible. Such web pages permit service requests and requests for access to software applications to be composed and transmitted to the central service facility, and facilitate the exchange of other messages, reports, software, protocols, etc. as described more fully below. The web server 118 communicates with a network via a modem 128. A connectivity service module 126 provides for interfacing with the web server 118. A Point-to-Point Protocol (PPP) module 128 is also provided for transmitting Internet Protocol (IP) packets over remote communication connections. As will be appreciated by those skilled in the art, various other network protocols and components may be employed for facilitating data exchange over a network.

Figure 4:
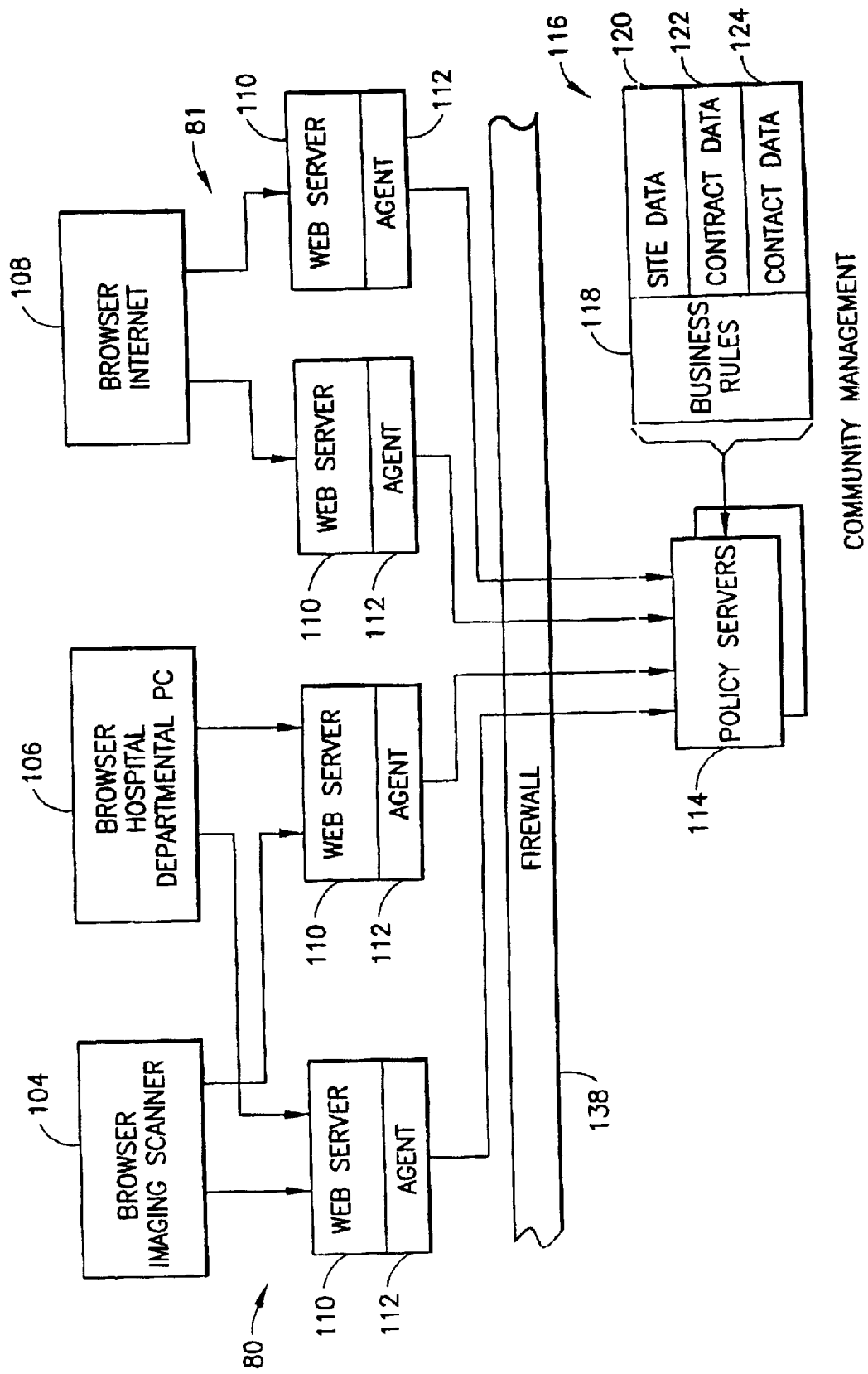
FIG. 4 is a block diagram showing portions of a community management system for use with one aspect of the invention.
Figure 5:
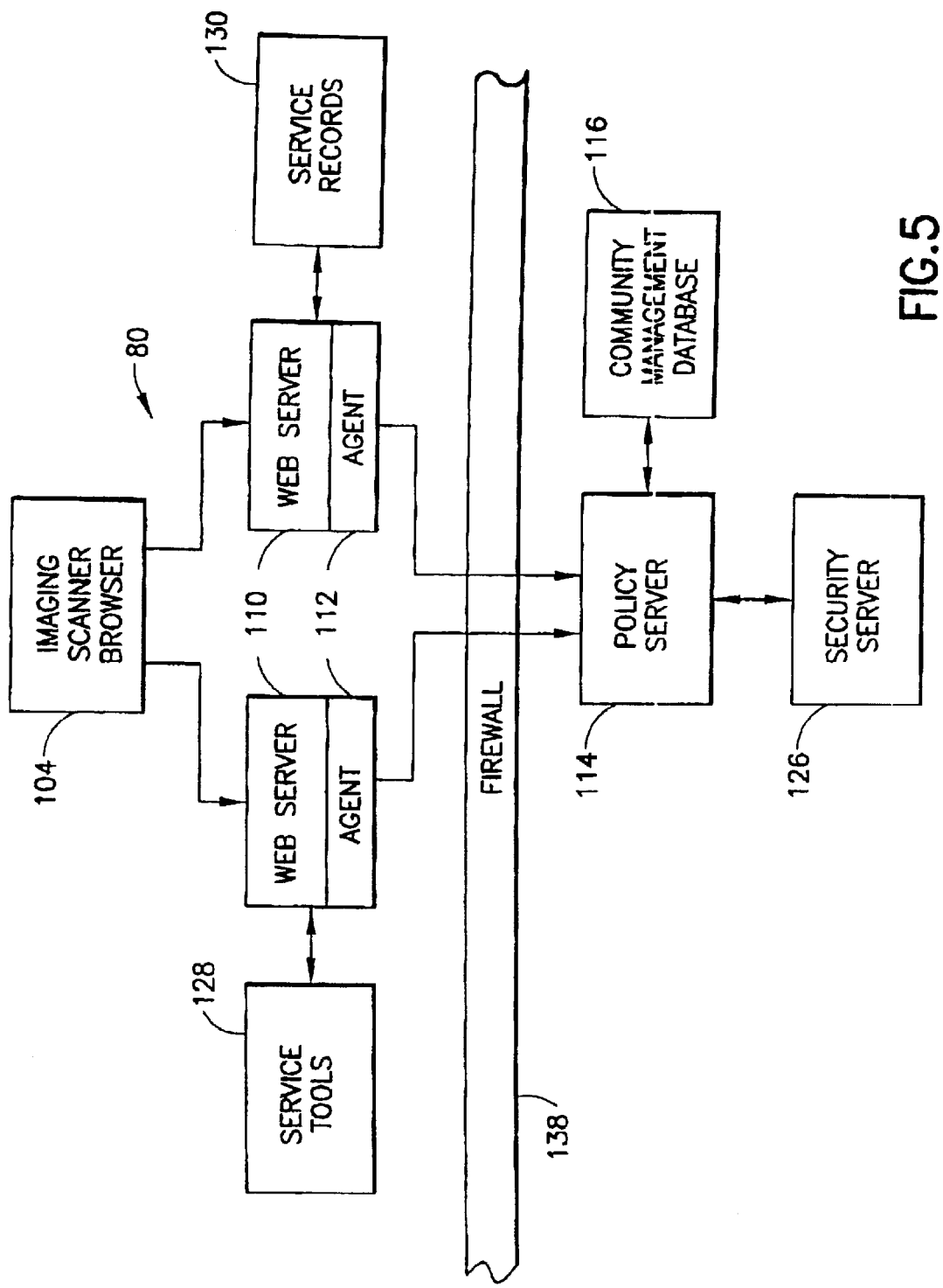
FIG. 5 is a block diagram showing portions of a system for community management of remote access with security clearance for use with one aspect of the invention.

A community management system may be incorporated in the service center processing system shown in FIG. 2. Alternatively, the community management system disclosed herein may be a stand-alone system. The preferred embodiments of the community management system are generally shown in FIGS. 4 and 5. In each embodiment, the system comprises a multiplicity of distributed web servers 110 which communicate with at least one policy server 114 across a firewall 138. Each web server 110 is programmed to provide access to one or more software applications, which may reside in the web server itself or may reside in respective applications servers connected to the web server 110. The web servers communicate with remote systems by means of networks. The software applications may be protected in the sense of requiring a security clearance for access or free in the sense of being openly available to anyone connected to the network. As explained in more detail hereinafter, the protected software applications in the preferred community management scheme fall into two categories: (1) those requiring a one-factor security clearance (e.g., a password) for access; and (2) those requiring a two-factor security clearance (e.g., a password and a randomly generated security code number).

FIG. 4 is intended to show a portion of a community management system employing a one-factor security scheme, while FIG. 5 is intended to show a portion of a community management system employing a two-factor security scheme.

FIG. 5 differs from FIG. 4 in that it additionally includes a security server 126 which communicates with the policy server 114 and which is programmed to authenticate the second factor of the two-factor security test, as will be described in greater detail later.

The remote systems accessing the web servers may comprise medical diagnostic systems, including imaging and monitoring systems. By way of example, FIG. 4 shows a browser 104 of an imaging scanner and a browser 106 of a hospital departmental personal computer, each of which can access a web server 110 via a remote access network 80, as well as a browser 108 which can access a web server 110 via the Internet 81. Each web server 110 is programmed with an agency module 112 for intercepting requests for access, determining whether the requested software is open or protected, and if protected, contacting a policy server 114. The agency module 112 provides an interface for communications between the web server 110 and the policy server 114.

Figure 8:
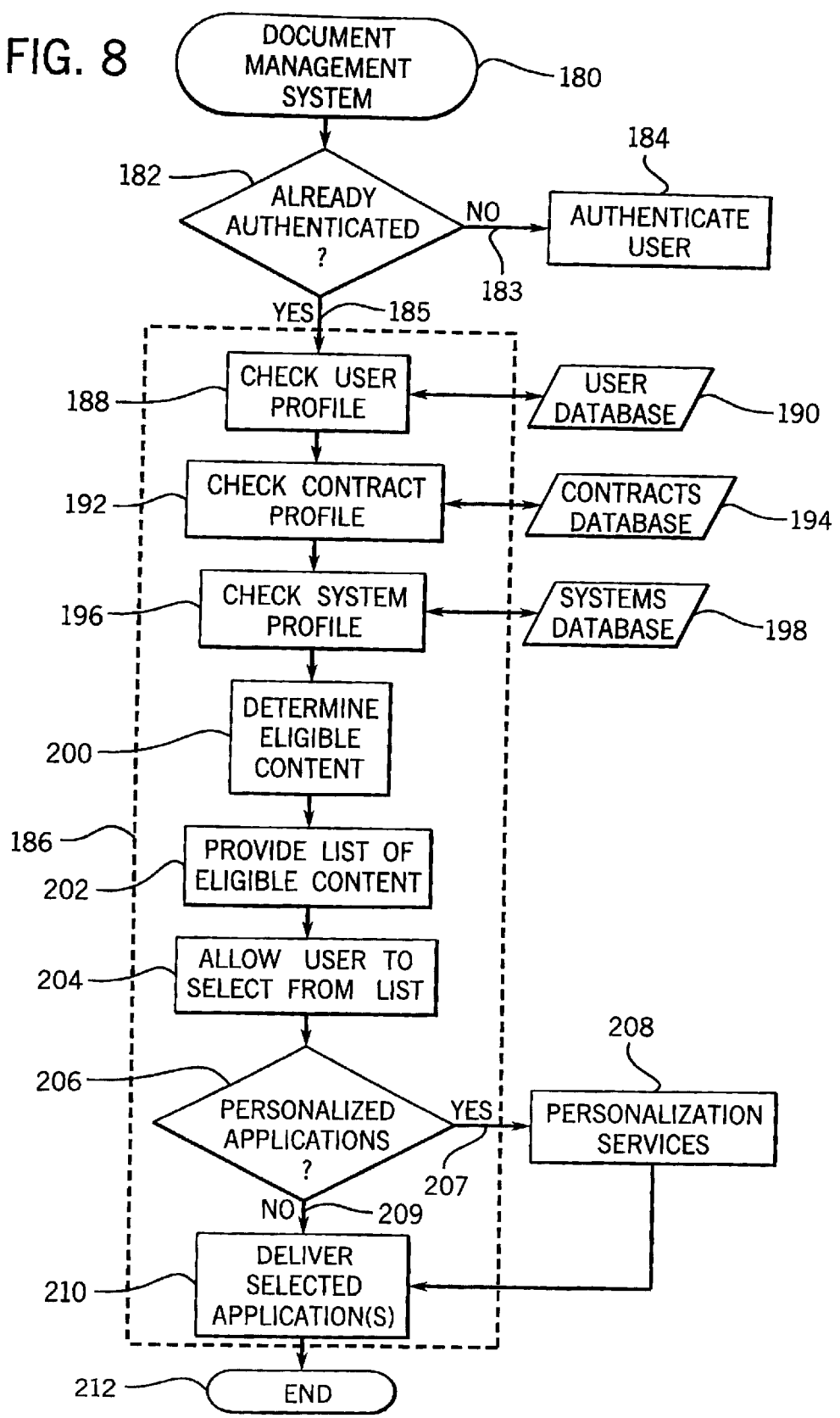
FIG. 8 is a flowchart showing a process for delivering a selected application to control and provide access to documentation by a user in accordance with the present invention.

The preferred embodiment further comprises a community management database 116. Generally, database 116 includes remote site data, contract or subscription data, contact or user data, and business rules (i.e., community definitions). As used herein, the term "community" refers to a group of remote system users having a particular set of access rights. As used herein, the term "software application" is intended to include software of any type, including but not limited to applications programming, configuration files, protocols, data files, worklists, service reports, service tools, system histories, system performance data, proprietary information about software used in remote medical diagnostic systems, repair techniques, business records, and so forth. In the preferred embodiment, as shown in FIG. 8, the software application is a document management system.

Referring back to FIG. 4, generally, the business rules stored in the community management database 116 provide the criteria for determining the software applications for which a member of a particular community has access rights. The contact or user data in the database 116 comprises user names, passwords, security codes, seed numbers, random number generation activation times, user job status or title, and other information. The contract data comprises information on the software applications which subscribing parties are entitled to access pursuant to existing contracts between remote facilities and the central service facility. The site data comprises information identifying the remote sites and the equipment used at those sites, including serial numbers of the diagnostic and imaging machines.

The invention includes web servers 110 for providing selective access to software applications having a high-level of protection, i.e., requiring a two-factor security clearance. Software applications having this high-level security would include service-related software used by a service engineer to repair, service, upgrade or maintain a remote diagnostic system, such as service tools 128 and service records 130 shown in FIG. 5. For example, a service engineer employed by the central service facility can be given a two-factor security clearance which would allow remote access, e.g., via the browser 104 of a remote imaging scanner and via a network, to software applications needed for servicing that imaging scanner. The first factor is the same factor utilized in the one-factor security clearance and is authenticated by the policy server 114. In accordance with the preferred embodiment shown in FIG. 5, a security server 126 is programmed to authenticate the second factor of the two-factor security clearance under the management of the policy server 114.

Figure 6:
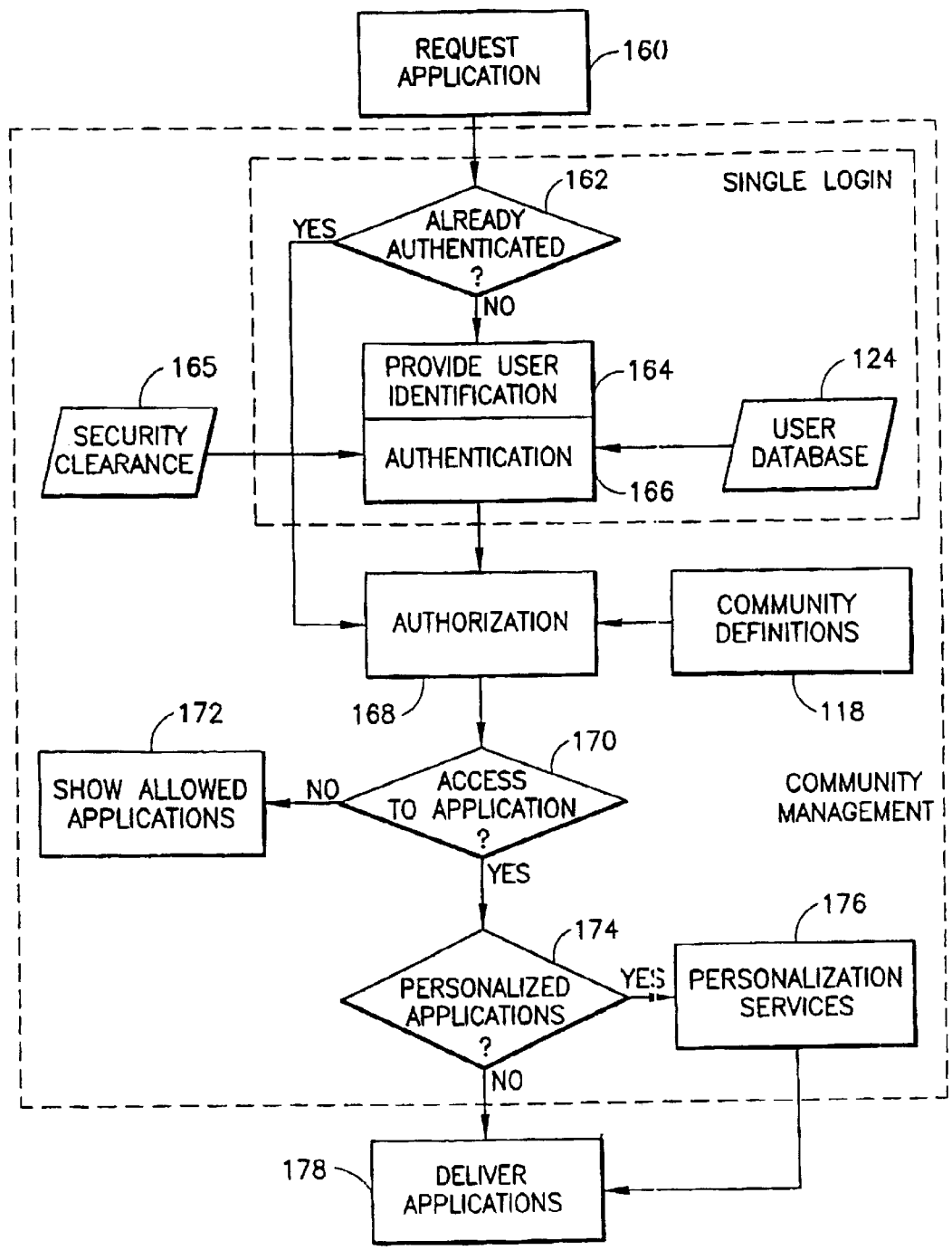
FIG. 6 is a flowchart generally depicting the secure community management process.

The preferred method for processing security clearances is shown in FIG. 6. Each remote system is programmed with a user interface of the type shown in FIG. 3 for accessing a web server 110 via network 80, such as an intranet. One of the web pages 124 maybe an applications web page which displays a multiplicity of virtual application selection buttons for selecting any one of a multiplicity of remotely accessible service-related (open or protected) software applications residing at the web servers 110. For the sake of discussion, it is assumed that the protected software applications residing at web servers 110 shown in FIG. 4 require a one-factor security clearance for access. In contrast, at least one of the protected software applications residing at a web server 110 shown in FIG. 5 requires a two-factor security clearance for access, thereby necessitating the presence of the security server 126. It should be further understood that some software applications may be open and not protected and other may require or allow some combination therebetween.

In response to the system user selecting a protected software application on the web browser screen, the web server 118 in the remote system sends a request to access the selected software application 160, FIG. 6, to the network via blocks 126, 128 and 130 shown in FIG. 3. Preferably, the URL address of the web server 110 where the selected software application resides is hard-coded into the remote system, that URL address being automatically attached to the request for access prior to connecting to the network.

The request for access from the remote system to the addressed web server 110 is immediately intercepted by that web server's agency module 112, which first determines whether the request for access relates to an open or a protected software application. If the software application is open, i.e., available without a security clearance, then the agency module so instructs the web server and the application is delivered to the remote system. FIG. 6 represents the process for approving requests for access to protected software.

If the software application being requested requires a security clearance, the agency module then determines whether the requesting remote system user has already been authenticated (step 162 in FIG. 6), i.e., has already logged in. If the user has already logged in, then the authentication step is skipped and the policy server immediately determines if the requested access is authorized 168. If the requesting remote system user has not already logged in, the addressed web server downloads a window to the remote web browser which has fields for entry of the user's name, password and security code. The remote system user then enters the user identification information needed by the policy server 164. In the case of a user having a one-factor security clearance, the user preferably enters a user name and a password; in the case of a user having a two-factor security clearance, the user preferably enters a user name, a password, and a security code generated by a random number generator in the user's possession. The web server 118, of FIG. 3, at the remote system then sends the inputted user information onto the network addressed to the web server 110, FIGS. 4 and 5, where the requested software application resides. The transmitted user information is intercepted by the agency module 112 and forwarded to the policy server 114 along with a code identifying the protected software application to which the request for access relates.

In the case of one-factor security clearances, the policy server authenticates the password 166, FIG. 6, with reference to the user database 124, which forms part of the community management database. In the simplest embodiment, the user database stores a password in association with each user name, and the policy server merely retrieves that password and compare it to the password received from the agency module where the requested software resides. If the password is not authentic, the addressed web server will send an error message to the remote system. If the user code is authentic, then the policy server must next determine whether the requested access is authorized 168. In the case of two-factor security clearances, the policy server authenticates a password while delegating authentication of an associated security code to the security server 165. If the password and security code are authentic, then the policy server proceeds to the authorization stage 168.

The policy server is programmed to determine whether the remote system user is authorized to access the protected software application by performing the following steps: retrieving authorization criteria (i.e., business rules or community definitions 118) for the protected software application from the community management database; retrieving information for one or more variables (i.e., user, site, system and contract information) from the community management database; and determining whether those variables satisfy those authorization criteria. The policy server 114 reads all of the pertinent data for the identified remote system user out of the community management database and stores that retrieved data in an internal log-in cache. Based on the criteria and variable data retrieved during the authorization step 168, the policy server 114 determines whether the requesting remote system user has access rights to the requested software application 170.

If the requesting remote system user is authorized to access the protected software application being requested, then the policy server issues an instruction to the agency module where the protected software resides to allow access to the associated web server then downloads the protected software application to the remote system at which the requesting user is logged in 178. As a result of downloading, the web server 118, FIG. 3, at the remote system displays the opening web page of the downloaded software application on the web browser 120.

Optionally, the algorithm shown in FIG. 6 includes the step 174 of determining whether the software application should be personalized prior to delivery, e.g., by including a welcome message in which the user is addressed by name. Any personalization services are performed by the web server in step 176. The personalized application is then delivered to the remote site in step 178.

The policy server is further programmed to instruct the agency module of the web server where the requested software resides to deny access if the remote system user is a member of a community not authorized to access that protected software. Optionally, the web server where the protected software resides is programmed to deliver to the remote system a list identifying all software applications to which the requesting remote system user has access rights 172 in response to a denial of access by the policy server 170.

The authentication step 162 of determining that the user code has already been authenticated, i.e., that the remote system user has already logged in successfully, is performed as follows. The web browser at each remote system and the agency module in each applications web server have a log-in cache for storing the user inputs (e.g., user name, password and security code) and an associated authenticity tag which is generated after authentication by the policy server. The sequence of operations will now be described. Once the remote system user transmits a request for access to a first web server, the first web server downloads a web page requesting the remote system user to log in. The remote system user then enters a user name and password (one-factor security clearance) or a user, password and security code (two-factor security clearance) via the user interface and sends that inputted data to the first web server, the user information being automatically stored in a web browser log-in cache. The agent of the first web server intercepts the inputted user information and sends it to the policy server.

If the user information is authentic, the policy server attaches an authenticity tag, stores the user information and authenticity tag in its log-in cache, and sends the same data back to the agent of the first web server. That same data is then stored in the log-in cache of the agency module and sent back to the remote system, the user information and authenticity tag being stored in the web browser log-in cache. When the remote system user subsequently transmits a request for access to a second web server, the user information and authenticity tag stored in the web browser log-in cache are automatically sent to that second web server. The agent of the second web server then relays the received user information and authenticity tag to the policy server. If the user information and authenticity tag sent by the second web server match the user information and authenticity tag stored in the log-in cache of the policy server, then the policy server sends a signal to the second web server indicating that the user code is authentic. Thus the second web server knows that it can skip the step of downloading the log-in web page to the remote system. These operations make it unnecessary for a remote system user requesting multiple software applications to log-in multiple times. Instead, a single log-in suffices no matter how many requests for access to software applications are made by a logged-in remote user.

In accordance with a further aspect of the present invention, access to software applications having a high-level of protection requires a two-factor security clearance. As previously described, the first factor is a secret password associated with a user name. The second factor is a randomly generated number which a remote system user reads from a portable device which he/she carries. The portable device incorporates a random number generator for continually generating numbers in accordance with a stored random number generation algorithm and a display screen which displays the current value in the sequence of randomly generated numbers. The random number generator is activated by the central service facility starting with a seed number inputted into the portable device by the central service provider. The time of random number generation activation is then stored in the user database along with the user name, password, seed number, and other user information.

Based on the presence of a security code in the user information received from the remote system user via the agency module 112, FIG. 5, the policy server 114 recognizes that a two-factor security clearance must be performed. Based on the user name, the policy server 114 then retrieves the user information for that user from the community management database 116. The policy server 114 compares the inputted password to the password retrieved from the database. If they match, the policy server then sends the security code inputted by the user and the seed number and activation time for random number generation retrieved from the database to the security server 126. Based on the activation time and the seed number received from the policy server and the random number generation algorithm stored in the security server, which is the same algorithm contained in the random number generator carried by the user, the security server generates a random number for use as a reference security code. The security code inputted by the user is authenticated if it lies within a predetermined range of the reference security code. The security server then advises the policy server of the results of the comparison. If the inputted security code is authentic, the policy server then proceeds to the authorization step. If the security code is not authentic, then the policy server instructs the relevant agency module to deny access to the requested software application. The agency module may then request the remote system user to re-attempt to log-in.

Figure 7:
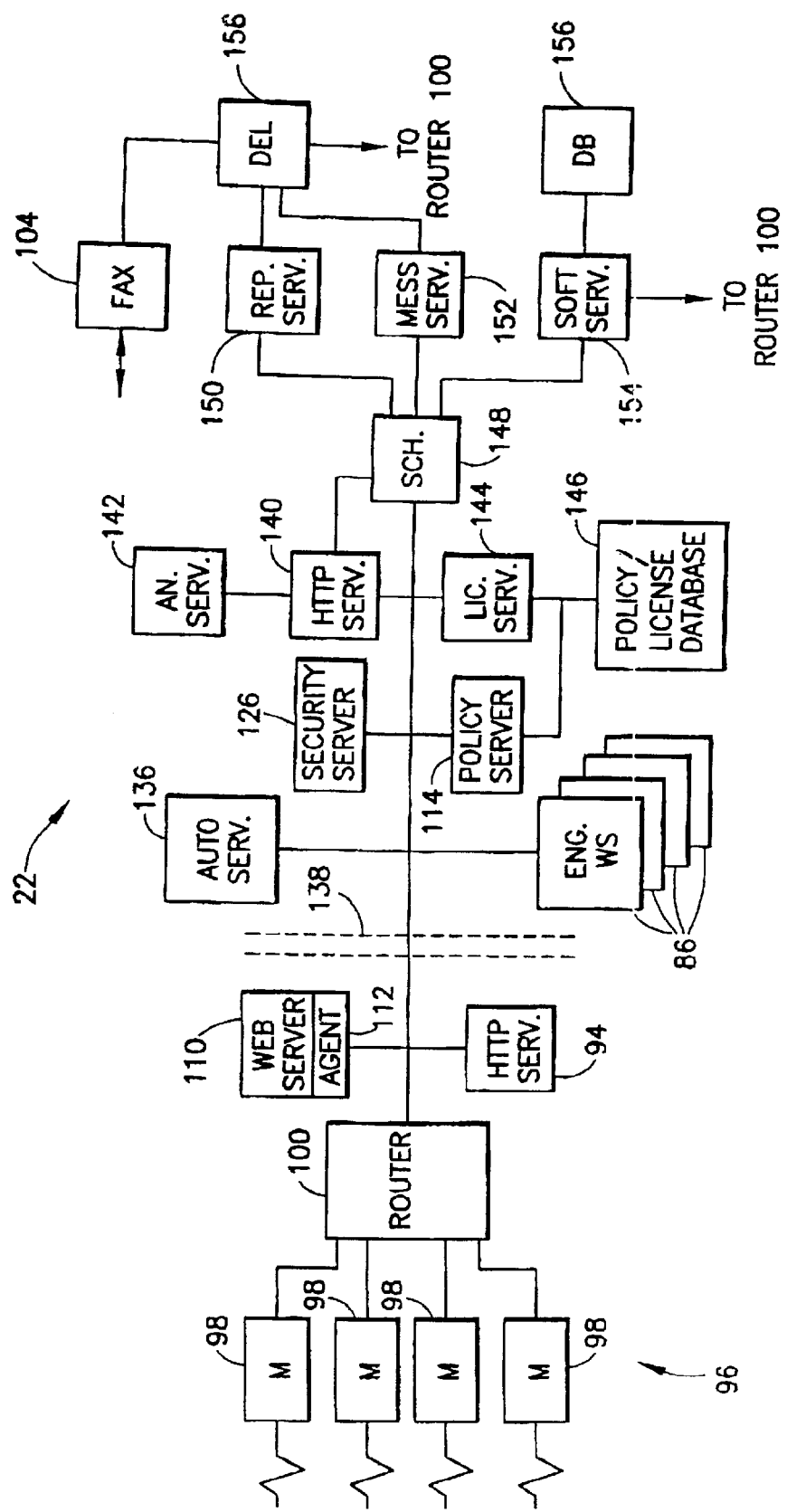
FIG. 7 is a block diagram showing a hybrid system which combines the embodiment of the invention with the conventional system depicted in FIGS. 1 and 2.

FIG. 7 illustrates exemplary functional components for a service facility 22. incorporating the present invention. As indicated above, service facility 22 includes a modem rack 96 comprising a plurality of modems 98 coupled to a router 100 for coordinating data communications with the service facility. A so-called "front office" HTTP service server 94 receives and directs incoming and outgoing transactions with the facility. Preferably the applications web servers are also arranged in front of the firewall 138. Only one applications web server 110 having an agency module 112 is shown in FIG. 6. Servers 94 and 110 are coupled to the other components of the facility through a firewall 138 for system security. Operator workstations 86 are coupled to the port manager for handling service requests and transmitting messages and reports in response to such requests. An automated service unit 136 may also be included in the service facility for automatically responding to certain service requests, sweeping subscribing diagnostic systems for operational parameter data, etc. In one embodiment, the automated service unit 136 may operate independently of or in conjunction with the interactive service components comprising processing system 84. It should be noted that other network or communications schemes may be provided for enabling the service facility to communicate and exchange data and messages with diagnostic systems and central service units, such as systems including Outside Internet service providers and virtual private networks.

Behind firewall 138, a so-called "back office" HTTP application server 140 coordinates handling of service requests, messaging, reporting, software transfers, etc. Other servers may be coupled to HTTP application server 140, such as service analysis servers 142 configured to address specific types of service requests. In the embodiment shown in FIG. 7, processing system 84 also includes a policy server 114, a security server 126 and a license server 144. The policy server and license server are both coupled to a policy/license database 146, which would include the aforementioned community management database as well as a license database. The license module 144 performs the functions of storing, updating and verifying the status of diagnostic system service subscriptions and contracts. Alternatively, license server 144 may be placed outside of firewall 138 to verify subscription status prior to admission to the service facility. The policy server 114 performs the functions previously described herein with reference to FIGS. 4–6. The license server 144 generates licenses, installs the generated licenses on the remote systems 12 via the network 80, and logs the licenses into the policy/license database 146. The license server 144 also has the capability to remove or terminate an installed license from a remote system via the network.

Handling of service requests, messaging, and reporting is coordinated by a scheduler module 148 coupled to HTTP server 140. Scheduler module 148 coordinates activities of other servers comprising the processing system, such as a report server 150, a message server 152, and a software download server 154. As will be appreciated by those skilled in the art, servers 150, 152 and 154 are coupled to memory devices (not shown) for storing data such as task lists, addresses, log files, message and report files, applications software, etc. In particular, as illustrated in FIG. 7, software server 154 is coupled via one or more data channels to a storage device 156 for containing transmittable software packages which may be sent directly to the diagnostic systems, accessed by the diagnostic systems, or supplied on pay-per-use or purchase basis. Message and report servers 152 and 154 are further coupled, along with communications module 104, to a delivery handling module 158, which is configured to receive out-going messages, ensure proper connectivity with diagnostic systems, and coordinate transmission of messages to the diagnostic systems and the transmission of messages and task lists to remotely located field engineers via the network.

The foregoing functional circuitry may be configured as hardware, firmware, or software on any appropriate computer platform. For example, the functional circuitry of the diagnostic systems may be programmed as appropriate code in a personal computer or workstation, either incorporated entirely in or added to the system scanner. The functional circuitry of the service facility may include additional personal computers or workstations, in addition to a main frame computer in which one or more of the servers, the scheduler, etc., are configured. Finally, the field service units may comprise personal computers or laptop computers of any suitable processor platform. It should also be noted that the foregoing functional circuitry may be adapted in a variety of manners for executing the functions described herein. In general, the functional circuitry facilitates the exchange of service data between the diagnostic systems and a central service facility, which is preferably implemented in an interactive manner to provide regular updates to the diagnostic systems of service activities.

Referring to FIG. 8, a document delivery method and document management system 180 are disclosed according to the present invention for allowing online user access to system documentation in the online central service facility 22, FIG. 1. The document management system 180, FIG. 7, is a specialized software application that may be called by the online central service facility for delivery of particular product and/or service data to a user. The product/service data itself includes both information and software and may be restricted or unrestricted.

Before any product/service data may delivered, the system checks to determine whether the user has been authenticated 182, and if not already authenticated 183, the system will require the user to be so authenticated based upon identifying indicia provided by the user, as previously described. Once properly authenticated 182, 185, the user is permitted to proceed further in the online central service facility's document delivery system. The main steps of the document delivery method are shown by dashed line 186.

The document management system 180 proceeds with checking the user profile 188. To do so, a user database is preferably accessed 190 and specific user data, including such information as the user's operative modality, status, and type (i.e. position or occupation) contained therein is confirmed for accuracy and correctness. Once the user profile has been checked 188, the system then checks the user's contract profile 192, and in so doing, preferably accesses a contracts database 194 which contains data pertaining to the user's contract status and eligibility. Finally, the system 180 conducts a user system profile check 196, preferably accessing a systems database 198 to retrieve and/or further determine information regarding the user's particular modality and product version.

The system and method preferably provide for separate databases 190, 194, 198 which contain specific user data. Also the system provides for the aforementioned detailed user checks to take place in the order described above. However, it should be apparent that the system could have a database for containing all information necessary to conduct the detailed user check. Further, the system 180 could be designed to perform the aforementioned checks in a different order, or to incorporate different checks as necessary.

Based upon the detailed checks and the user authentication, the system 180 determines the particular product/service data, or eligible content 200 to which the user is entitled access. The particular product/service data specifically pertains to the modality the user is using. Once the eligible content has been determined 200, the system 180 provides a list of the eligible content 202, and the user is then allowed to select the desired product/service data from the list of eligible content 204.

In the preferred embodiment, the delivery system 180 provides for a personalized application 206. If so desired 206, 207, certain personalization services 208 may be provided, such as, a user may be provided with personalized browser specifications or features such as a desired browser color scheme or use of a personal name. Such personalizing by the system 180 for a particular user can be provided before the system delivers any selected application(s) to the user as previously discussed with references to FIG. 6. If personalized applications are not desired 206, 209, or were already set, the system proceeds directly to delivery of the particular product/service data to the user 210, which completes the method 212 performed by the system.

In accordance with one aspect of the invention, a document delivery method is disclosed for providing online access over a computer network to system. The method requires a user to enter identifying indicia for authentication checking via a user interface so that the user may be matched with user data that is stored in at least one user database. The online central service facility has at least one documentation database, the documentation database having product and/or service data stored therein. The method further requires that the user is authenticated for access into a document management system, with such authentication being based on the aforementioned identifying indicia. The user data is checked to determine what particular product/service data the user is entitled to from the document management system. The method also provides for delivery of the particular product/service data to the user.

Further, it should be noted that at least a portion of the product/service data is restricted product/service data. The identifying indicia is further defined to comprise at least a password and must be provided to gain access to the restricted product/service data. Checking the user data includes confirming a user profile which itself is created from the user data and comprises a user type, operative user modality and a user status. Checking the user data includes confirming a user contract profile which itself is created from the user data and comprises a user contract status. The contract profile may define what particular product/service data the user is entitled to from the document management system. Also, checking the user data includes confirming a system profile, which itself is created from the user data and comprises information pertaining to a particular system used by the user, such as modality and product version information. Particular systems used by the user include medical devices and modalities such as MRI systems, ultrasound imaging systems, x-ray systems, PET systems, and CT systems.

The method comprises the step of sorting product/service data into restricted and unrestricted product/service data. The user is entitled to all unrestricted product/service data and provided limited access to restricted product/service data, based on what the user is determined to be entitled to from the document management system. The method further comprises the sorting the product/service data into multiple levels of restricted data, with each requiring another security level to access. The method further comprises the steps of providing a list of eligible content from the restricted data which the user may select particular product/service data as well as delivering such selected particular product/service data to the user. The list of eligible content is determined based on the user contract and the particular products the user has at a particular facility. The method includes personalizing the user interface in such ways as setting particular browser specification such as a color scheme, or using a personal user name. And the method includes providing unrestricted access to unrestricted product/service data to any users who are determined to be authenticated.

In accordance with another aspect of the invention, a computer data signal, embodied in a carrier wave and representing a sequence of instruction, is disclosed to provide limited user access over a computer network to a document management system. The sequence of instructions, when executed by one or more processors, causes the processors to connect a user accessible computer to an online central service facility via the computer network. The one or more processors are further caused to transmit a user identification over the computer network to that the user may be matched with user data that is stored in at least one user database of the online central service facility. The one or more processors are further caused to authenticate the user for access into a document management system in the online central service facility. The processors are also caused to specify what particular product/service data the user is entitled to based on user parameters. The user parameters are stored within the document management system.

The user parameters are used to authenticate the user and include at least one of: a user profile, a user contract profile, and a user system profile. Each such profile is created from the user data stored in the at least one user database. The one or more processors are further caused to provide a list of eligible content to the user from the restricted product/service data. The user then selects desired restricted product/service data from the list of eligible content.

In accordance with another aspect of the invention, a document management system is disclosed. The document management system provides product/service data based on a level of security for a particular user. The system comprises at least one online central service facility, the facility having access to product/service data and having at least one computer and at least one database. The system comprises a server that is communicatively linked to the online central service facility. The server is capable of being connected to a user accessible computer. This allows the user to access the online central service facility. The at least one database contains product/service data and user data. The at least one online central service facility computer is programmed to authenticate the user for access into the document management system in the online central service facility, as well as specify what particular product/service data the user is entitled to based on user parameters that are stored within the document management system.

As used in the claims, the term "product/service data" is intended to include software and data of any type relating to a user's product, including but not limited to applications programming, configuration files, protocols, data files, worklists, service reports, system histories, service tools, system performance data, proprietary documents, repair techniques, business records, and so forth.

The present invention has been described in terms of the preferred embodiment. It is recognized that equivalents, alternatives, and modifications, aside from those expressly stated, are possible arid within the scope of the appending claims.

What is claimed is:

1. A document delivery method for providing online access to system documentation comprising the steps of:
   requiring a user to enter identifying indicia over a computer network and via a user interface so as to match the user with user data stored in at least one user database for authentication checking by an online central service facility, the online central service facility having at least one documentation database having therein product/service data;
   authenticating the user for access into a document management system based on the identifying indicia;
   checking the user data once the user is authenticated to determine what particular product/service data the user is entitled to from the document management system for delivery to the user;
   delivering the particular product/service data to the user; and
   sorting product/service data into restricted and unrestricted product/service data, wherein the user is entitled to all unrestricted product/service data and provided limited access to restricted product/service data based on what the user is determined to be entitled to from the document management system.

2. The method of claim 1 wherein at least a portion of the product/service data is restricted product/service data and the identifying indicia is further defined to comprise at least a password to gain access to the restricted product/service data.

3. The method of claim 1 wherein the step of checking the user data is further defined to include confirming a user profile, the user profile created from the user data and comprising a user type, an operative user modality, and a user status.

4. The method of claim 1 wherein the step of checking the user data is further defined to include confirming a user contract profile, the contract profile created from the user data and comprising a user contract status and defining what particular product/service data the user is entitled to from the document management system.

5. The method of claim 1 further comprising the step of sorting the restricted product/service data into multiple levels of restricted data, each requiring another security level to access.

6. The method of claim 1 further comprising the steps of:
   providing a list of eligible content from the restricted data from which the user may select particular product/service data; and
   delivering such selected particular product/service data to the user.

7. The method of claim 6 wherein the step of providing a list of eligible content is based on a user contract and what particular products the user has at a particular facility.

8. The method of claim 1 further comprising the step of personalizing the user interface for access by the user, the personalizing including browser specifications and use of a personal user name.

9. The method of claim 8 wherein the browser specifications include color scheme.

10. The method of claim 1 further comprising the step of providing unrestricted access to unrestricted product/service data to any users determined to be authenticated.

11. A document delivery method for providing online access to system documentation comprising the steps of:
  requiring a user to enter identifying indicia over a computer network and via a user interface so as to match the user with user data stored in at least one user database for authentication checking by an online central service facility, the online central service facility having at least one documentation database having therein product/service data;
  authenticating the user for access into a document management system based on the identifying indicia;
  checking the user data once the user is authenticated to determine what particular product/service data the user is entitled to from the document management system for delivery to the user;
  delivering the particular product/service data to the user; and
  wherein the step of checking the user data is further defined to include checking a system profile, the system profile created from the user data and comprising information pertaining to a particular system used by the user including modality and product version information, wherein the particular system is a medical device and the modality is selected from one of: a MRI system, an ultrasound imaging system, and x-ray system, a PET system, and a CT system.

12. The method of claim 11 wherein the step of checking the user data is further defined to include confirming a user contract profile, the contract profile created from the user data and comprising a user contract status and defining what particular product/service data the user is entitled to from the document management system.

13. A computer data signal embodied in a carrier wave, the signal representing a sequence of instructions to provide limited user access over a computer network and a document management system, the sequence of instructions which, when executed by one or more processors, causes the one or more processors to:
  connect a user accessible computer to an online central service facility via a computer network;
  transmit a user identification over the computer network so as to match a user with user data stored in at least one user database of the online central service facility;
  authenticate the user for access into a document management system in the online central service facility;
  specify what particular product/service data the user is entitled to based on user parameters stored within the document management system; and
  wherein the product/service data is sorted into restricted and unrestricted product/service data, and wherein the user is entitled to all unrestricted product/service data and provided limited access to restricted product/service data based on a level of security determined by the user identification.

14. The computer data signal of claim 13 wherein the one or more processors are further caused to transmit the particular product/service data to the user.

15. The computer data signal of claim 13 wherein at least a portion of the product/service data is restricted product/service data and the user identification comprises at least a password to gain access to the restricted product/service data.

16. The computer data signal of claim 13 wherein the user parameters used to authenticate the user include at least one of: a user profile, a user contract profile, and a user system profile, each profile created from the user data stored in the at least one user database.

17. The computer data signal of claim 13 wherein the one or more processors are further caused to provide a list of eligible content to the user from the restricted product/service data and requires the user to select desired restricted product/service data from the list of eligible content.

18. A computer data signal embodied in a carrier wave, the signal representing a sequence of instructions to provide limited user access over a computer network to a document management system, the sequence of instructions which, when executed by one or more processors, causes the one or more processors to:
  connect a user accessible computer to an online central service facility via a computer network;
  transmit a user identification over the computer network so as to match a user with user data stored in at least one user database of the online central service facility;
  authenticate the user for access into a document management system in the online central service facility;
  specify what particular product/service data the user is entitled to based on user parameters stored within the document management system;
  wherein the user parameters used to authenticate the user include at least one of: a user profile, a user contract profile, and a user system profile, each profile created from the user data stored in the at least one user database; and
  wherein the user profile comprises a user type, user modality, and user status, wherein the user contract profile comprises a user contract status, wherein the user system profile comprises information pertaining specific system used by the user including modality, product version information, and wherein the particular system is a medical device and the modality is selected from one of: a MRI system, an ultrasound imaging system, an x-ray system, a PET system, and a CT system.

19. A document management system to provide product/service data based on a level of security for a particular user comprising:
  at least one online central service facility having access to product/service data and having at least one computer and at least one database; and
  a server communicatively linked to the online central service facility and capable of connection to a user accessible computer to allow user access to the online central service facility;
  wherein the at least one database contains product/service data and user data and the at least one computer of the online central service facility is programed to:
    authenticate the user for access into a document management system in the at least one online central service facility;
    specify what particular product/service data the user is entitled to based on user parameters stored within the document management system; and
    wherein the system sorts the product/service data into restricted and unrestricted product/service data, wherein the user is entitled to all unrestricted product/service data and provided limited access to restricted product/service data based on what the user is determined to be entitled to, and wherein the restricted product/service data is sorted into multiple levels of restricted product/service data, each requiring another security level to access.

20. The document management system of claim 19 wherein the user provides a user identification comprising at least a password, wherein the system authenticates the user based on the user identification so that the online central service facility can determine a level of security based on the user identification.

21. The document management system of claim 19 wherein user, once so authenticated by the system, is further checked by the system based on the user data stored in the at least one database before the user may access any restricted product/service data in the online documentation system.

22. A document management system to provide product/service data based on a level of security for a particular user comprising:
- at least one online central service facility having access to product/service data and having at least one computer and at least one database; and
- a server communicatively linked to the online central service facility and capable of connection to a user accessible computer to allow user access to the online central service facility;
- wherein the at least one database contains product/service data and user data and the at least one computer of the online central service facility is programmed to:
  - authenticate the user for access into a document management system in the at least one online central service facility;
  - specify what particular product/service data the user is entitled to based on user parameters stored within the document management system;
  - wherein the user provides a user identification comprising at least a password, wherein the system authenticates the user based on the user identification so that the online central service facility can determine a level of security based on the user identification; and
  - wherein the user, having been authenticated and further checked by the system, accesses particular product/service data pertaining to a user's particular modality, and the user's particular modality is selected from one of: a MRI system, an ultrasound imaging system, an x-ray system, a PET system, and a CT system.

23. The document management system of claim 19 wherein the user selects particular product/service data from a list of eligible content provided by the user and the system delivers such selected particular product/service data.

24. The document management system of claim 19 wherein the system comprises a search engine feature to permit the user to search for particular product/service data.

* * * * *